(12) United States Patent
Bruin et al.

(10) Patent No.: US 8,879,477 B2
(45) Date of Patent: Nov. 4, 2014

(54) RADIO COVERAGE ENHANCEMENT

(75) Inventors: Peter De Bruin, Gammelstad (SE); Christer Friberg, Täby (SE); Bo Hagerman, Tyresö (SE); Magnus Olsson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1802 days.

(21) Appl. No.: 12/294,733

(22) PCT Filed: Mar. 19, 2007

(86) PCT No.: PCT/EP2007/052564
§ 371 (c)(1),
(2), (4) Date: Jun. 1, 2010

(87) PCT Pub. No.: WO2007/110338
PCT Pub. Date: Oct. 4, 2007

(65) Prior Publication Data
US 2010/0238869 A1    Sep. 23, 2010

Related U.S. Application Data

(60) Provisional application No. 60/786,724, filed on Mar. 29, 2006.

(51) Int. Cl.
| | | |
|---|---|---|
| H04W 4/00 | (2009.01) | |
| H04B 1/00 | (2006.01) | |
| H04B 7/06 | (2006.01) | |
| H04W 16/24 | (2009.01) | |
| H04B 7/10 | (2006.01) | |
| H04B 7/26 | (2006.01) | |
| H04W 16/26 | (2009.01) | |

(52) U.S. Cl.
CPC ............. H04W 16/24 (2013.01); H04B 7/0604 (2013.01); H04B 7/2606 (2013.01); H04W 16/26 (2013.01); H04B 7/10 (2013.01)
USPC .......................................... 370/329; 375/132

(58) Field of Classification Search
USPC .......................................................... 370/329
See application file for complete search history.

(56) References Cited

U.S. PATENT DOCUMENTS

| | | | |
|---|---|---|---|
| 2002/0122406 A1* | 9/2002 | Chillariga et al. | 370/347 |
| 2003/0072293 A1 | 4/2003 | Fischer | |
| 2004/0203727 A1* | 10/2004 | Abiri et al. | 455/423 |
| 2004/0203806 A1* | 10/2004 | Craig et al. | 455/450 |
| 2004/0214608 A1* | 10/2004 | Mostafa et al. | 455/562.1 |
| 2005/0009473 A1* | 1/2005 | Ranta et al. | 455/83 |
| 2006/0052066 A1* | 3/2006 | Cleveland et al. | 455/101 |

(Continued)

*Primary Examiner* — Gerald Smarth
(74) *Attorney, Agent, or Firm* — Nixon & Vanderhye P.C.

(57) ABSTRACT

The invention provides an increase in the radio coverage area (10) of a base transceiver station (100) having access to multiple transceivers (102, 104, 106, 108) by dedicating at least one of the transceivers (102) for BCCH data. This BCCH transceiver (102) is connected to an antenna arrangement (120) 5 comprising at least two antenna elements (121, 123; 125, 127). Increased BCCH radio coverage (30) is achieved by providing antenna hopping among the at least two antenna elements (121, 123; 125, 127) for the BCCH. Correspondingly, increased TCH coverage (20) is achieved by providing frequency hopping among at least two carrier frequencies for the TCH. The 10 coverage (10) of the base transceiver station (100) is defined as the intersection of the BCCH radio coverage (30) and the TCH coverage (20).

16 Claims, 8 Drawing Sheets

(56) References Cited

U.S. PATENT DOCUMENTS

| | | | |
|---|---|---|---|
| 2006/0105776 A1* | 5/2006 | Burke | 455/456.1 |
| 2006/0238321 A1* | 10/2006 | Chen | 340/438 |
| 2006/0268849 A1* | 11/2006 | Larsson et al. | 370/356 |
| 2007/0069962 A1* | 3/2007 | Lucidarme et al. | 343/702 |
| 2010/0074360 A1* | 3/2010 | Lee et al. | 375/267 |

* cited by examiner

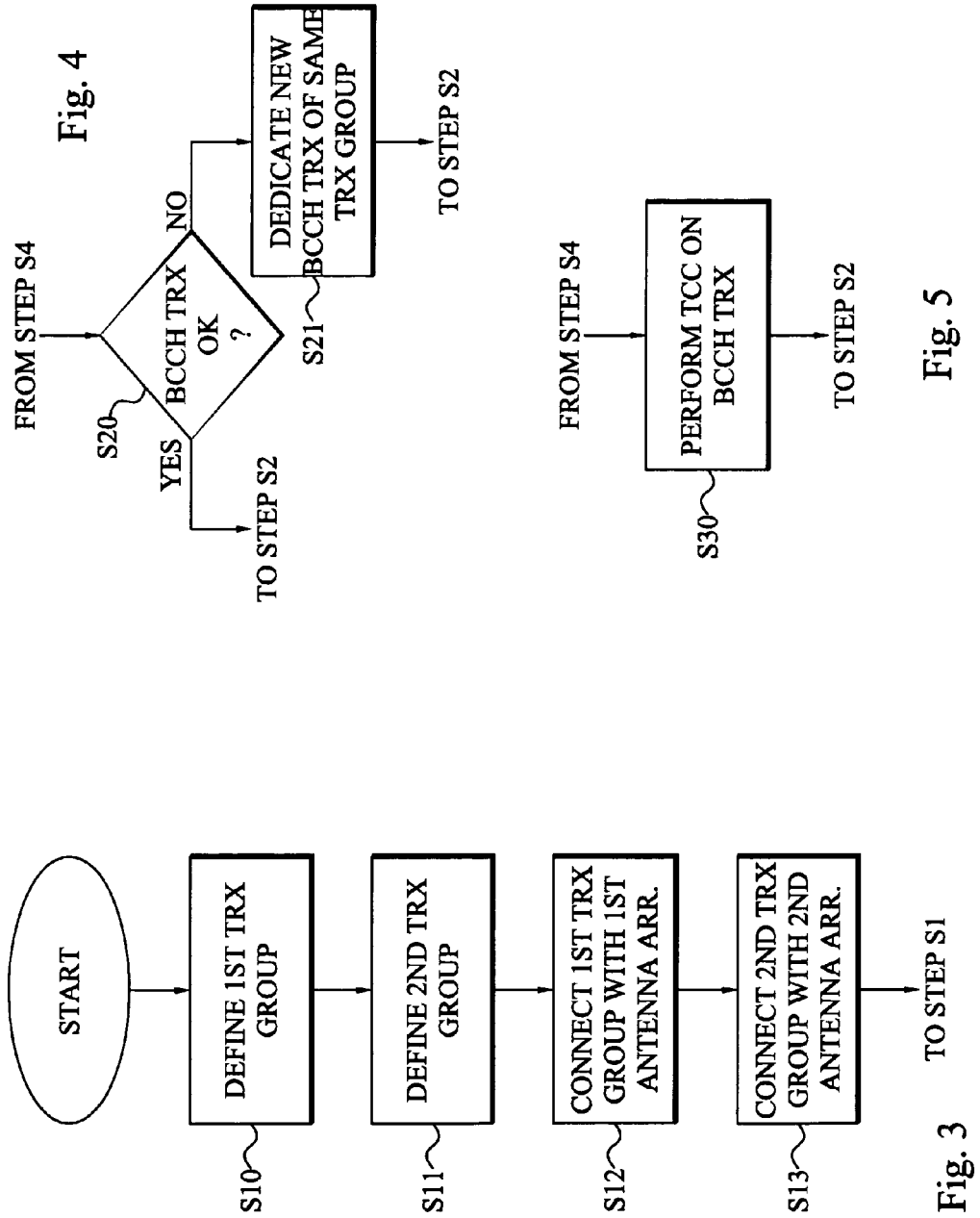

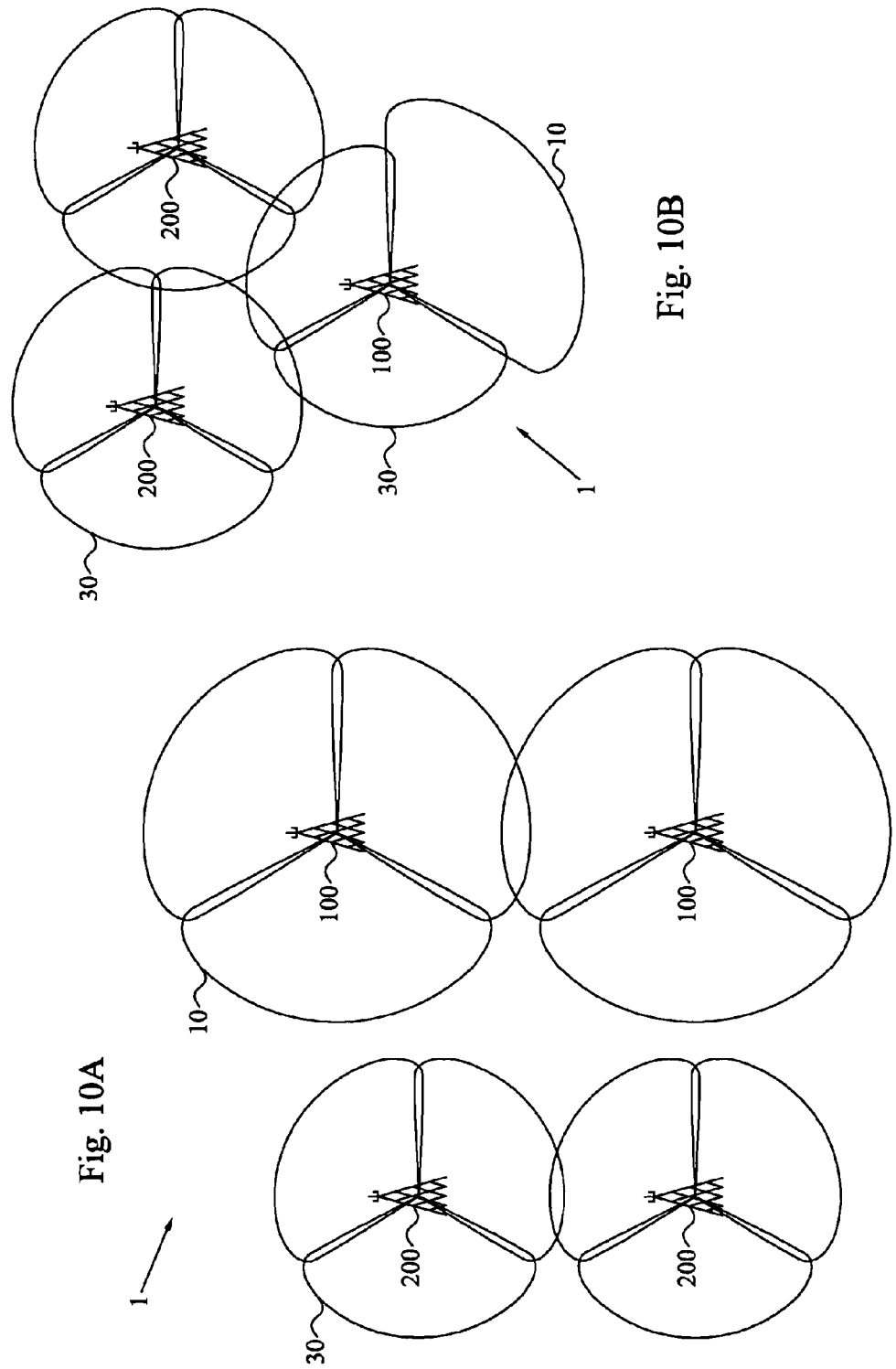

RADIO COVERAGE ENHANCEMENT

This application is the U.S. national phase of International Application No. PCT/EP2007/052564, filed 19 Mar. 2007, which designated the U.S. and claims priority to U.S. Application No. 60/786,724 filed 29 Mar. 2006, the entire contents of each of which are hereby incorporated by reference.

TECHNICAL FIELD

The present invention generally relates to radio coverage management, and in particular to providing an increased radio coverage of cells in a cellular communication system.

BACKGROUND

Radio coverage is a crucial parameter when designing new radio-based communication networks and when managing existing networks. Without adequate (geographical) radio coverage some communication services or other application services may not be available to users of the network at cell borders or so-called coverage holes.

In emerging markets, radio coverage is very important since site acquisition, base station hardware and installation costs could be reduced if fewer base transceiver stations, but with enhanced coverage, could be employed.

In developed markets, existing networks are typically denser and rural coverage may not be a major problem. However, also in such developed networks, in particular in urban environments, there are still coverage holes with no or poor radio coverage. For example, such urban coverage holes may be experienced in indoor environments.

The straightforward approach when improving radio coverage is to boost the downlink output power. However, traditional base transceiver stations are often already run at or near their maximum limits in output power. This means that no or only marginal further coverage increases are possible with this technique.

Improved downlink capacity and also increased radio coverage can be achieved by using transmit diversity. Transmit diversity uses signals that originate from two or more independent sources but that have been modulated with identical information-bearing signals. These signals may therefore vary in their transmission characteristics. Transmit diversity alleviates the negative effects of fast fading in the networks.

Global System for Mobile Communications (GSM) and such systems adopting the Enhanced Data rates for GSM Evolution (EDGE) technology today employ a version of transmit diversity denoted frequency hopping in the art. Frequency hopping is a transparent transmit diversity scheme since no new receiver algorithms are required. Frequency hopping implies hopping between or switching of carrier frequencies during radio transmissions. The transmitted radio signals are subject to multipath propagation, which results in space and frequency dependent multipath fading at the receivers. Since the multipath fading is frequency selective, the fading can be combated by this hopping between carrier frequencies.

Thus, there are techniques in the art for improving the radio coverage for downlink traffic channels by the introduction of frequency hopping. However, frequency hopping is currently not allowed to be used for the broadcast control channel (BCCH). This means that the coverage of a base transceiver station will be limited by the BCCH coverage of that station.

The document US 2003/0072293 discloses a technique for improving the overall spectral efficiency of a wireless telecommunication system. The technique involves transmission of a multiframe signal having a plurality of sub-frames with predefined logical channels repeatedly embedded in predefined sub-frames. A transmitter diversity is applied using antenna and/or polarization hopping sequences such that during the transmission of the multiframe signal, each logical channel is transmitted at least two times with a different antenna and/or polarization.

SUMMARY

The present invention overcomes these and other drawbacks of the prior art arrangements.

It is a general object of the present invention to provide an increased radio coverage of a base transceiver station.

It is a particular object of the invention to provide such an increased radio coverage even for dynamic transceiver allocation and/or after a transceiver failure.

These and other objects are met by the invention as defined by the accompanying patent claims.

Briefly, the present invention involves increasing the radio coverage area of a base transceiver station by introducing transmitter diversity to downlink signals communicated by the base transceiver station. According to the present invention a first form of transmitter diversity, frequency hopping is available for a traffic channel of the base transceiver station. This means that the station has multiple available carrier frequencies and hops between these frequencies when transmitting data of the traffic channel in order to combat fading. A second form of transmitter diversity, antenna hopping is used according to the present invention for the broadcast control channel of the base transceiver station. The station has an antenna arrangement comprising multiple antenna elements and hops between these elements when transmitting (control) data of the broadcast control channel.

The frequency hopping will improve the radio coverage area of the traffic channel sent by a traffic channel transceiver, while the antenna hopping increases the corresponding coverage area of the broadcast control channel transmitted by a broadcast control channel transceiver. The total coverage of the base transceiver station is the intersection of these two coverage areas.

In order to fully exploit the coverage increase provided by the antenna hopping it is important that the beam characteristics and directions of the two antenna elements of the antenna arrangement are substantially the same. The present invention solves this problem by dedicating one of multiple transceivers available at the base transceiver station for usage with the broadcast control channel. This will secure correct beam characteristics and directions even if the base transceiver station utilizes dynamic transceiver allocation.

In a particularly preferred embodiment the base transceiver station has at least two antenna arrangements, of which at least a first one has multiple antenna elements. In such a case, the transceivers of the base transceiver stations are divided into at least two transceiver groups, of which at least a first one comprises multiple transceivers. The transceivers of the first group are connected to the first antenna arrangement and the transceivers of the second group are likewise connected to the second antenna arrangement. A first transceiver in the first group is then the dedicated broadcast control channel transceiver, while remaining transceivers in the first group and in the second (and further) group(s) can be assigned as traffic channel transceivers. Antenna hopping is utilized for data from the dedicated broadcast control channel transceiver, while frequency hopping is performed on traffic data from the remaining transceivers.

As one of the transceivers of the first group is a broadcast control channel dedicated transceiver, all control data of that channel will be sent through the first antenna arrangement connected to the dedicated transceiver even though dynamic transceiver allocation would be utilized. Furthermore, if the dedicated transceiver would become inoperative, the base transceiver station automatically switches to another transceiver of the first group, i.e. same group as the now inoperative control channel transceiver. This other transceiver thereby becomes the new dedicated broadcast control channel transceiver. As the new and previous dedicated transceivers belong to the same group and are connected to the same antenna arrangement, the antenna hopping will still result in substantially similar beam directions and characteristics even after the transceiver switch.

The present invention thereby improves the coverage areas of base transceiver stations, which can be exploited for covering previous radio "coverage holes" in a communication network. Furthermore, in emerging networks, increased site-to-site distances are made possible by implementing the present invention, thereby reducing the number of base transceiver station for covering a given geographical network area.

The improvement in radio coverage of the invention comes without any necessity to update existing user terminals, mobile stations, etc. conducting communication with the base transceiver station as the invention employs transparent transmit diversity schemes that do not require any new receiver algorithms.

SHORT DESCRIPTION OF THE DRAWINGS

The invention together with further objects and advantages thereof, may best be understood by making reference to the following description taken together with the accompanying drawings, in which:

FIG. 3 is a flow diagram illustrating additional steps of the method of increasing radio coverage area according to an embodiment of the present invention;

FIG. 4 is a flow diagram illustrating additional steps of the method of increasing radio coverage area according to another embodiment of the present invention;

FIG. 5 is a flow diagram illustrating an additional step of the method of increasing radio coverage area according to a further embodiment of the present invention;

FIGS. 10A and 10B are overviews of Cellular communication networks housing a base transceiver station according to the present invention.

DETAILED DESCRIPTION

Figure 1:
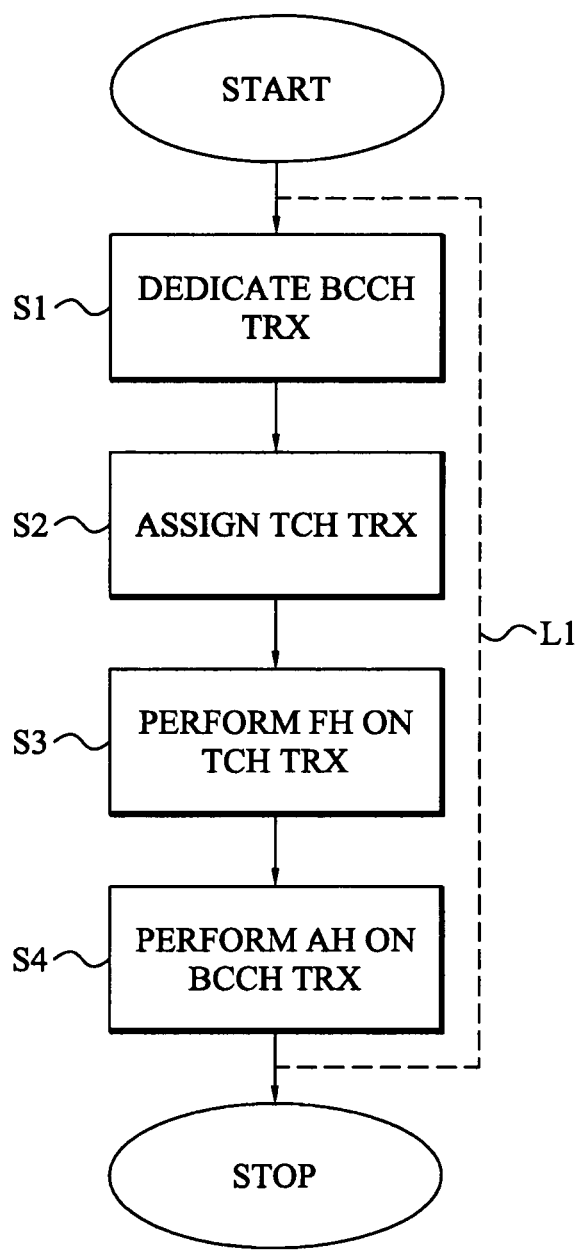
FIG. 1 is a flow diagram of a method of increasing a radio coverage area of a base transceiver station according to the present invention.

Throughout the drawings, the same reference characters will be used for corresponding or similar elements.

The present invention relates to radio coverage management in a cellular communication system, and in particular to increasing radio coverage areas of base transceiver stations in such a system.

According to the present invention, a "cell" of a communication system is a limited geographical area or portion of the coverage area of the system, in which a base transceiver station (network node) provides communication services to user terminal present within the cell. For example, a cell could be a circular, semi-circular or elliptical area around a base transceiver station being able to communicate with user terminals present within this area. The term "cell" as used herein also covers non-circular areas such as a sector or portion of a circular area around a base transceiver station. In such a case, the base station is typically equipped with multiple antenna arrangements and transmitters/receivers, collectively denoted transceivers herein, which provide radio-coverage within different sectors (cells) around the single base transceiver station.

The base transceiver station (BTS) of the present invention has access to multiple, i.e. at least two, different transceiver units used for conducting communication with user terminals present in the radio coverage area (cell) of the BTS. In the present invention, the BTS has at least one broadcast control channel (BCCH), which is a downlink channel carrying, among others, control data to the user terminals. As is known in the art, the BCCH channel typically contains specific control parameters needed by a user terminal in order to identify the communication network and gain access to the network. Typical information transmitted on the BCCH includes location area code (LAC), mobile network code (MNC) and BCCH allocation (BA) list. Furthermore, the BTS has at least one downlink traffic channel (TCH) or packet data TCH (PDTCH) for carrying payload traffic data of different communication and application services from the BTS to the connected user terminals.

FIG. 1 is a flow diagram illustrating a method of increasing the radio coverage area of a BTS having multiple transceivers (TRXs) according to the invention. The method starts in step S1, where at least one transceiver is dedicated for the BCCH in a cell of the BTS. In a typical implementation, one of the multiple transceivers of the BTS is dedicated in this step S1. However it could actually be possible to dedicate more than one BCCH transceiver for a given BTS cell. This BCCH transceiver dedication implies that the transceiver will be employed for, among others, carrying control data of the BCCH channel. However, it is anticipated by the present invention that the dedicated BCCH transceiver may as well carry traffic data on (logical) TCH or PDTCH channels. In practice, one or two timeslots are typically dedicated for control data, whereas remaining time slots can then be used for traffic data. BCCH data will be available in a radio coverage area of the dedicated BCCH transceiver(s). However, the dedication implies that the control data of the BCCH channel will not be transmitted using any other TRX of the BTS besides the dedicated BCCH transceiver(s).

In a next step S2, at least one transceiver is assigned for a traffic channel. In a typical implementation, all the remaining transceivers of the BTS that were not dedicated for use with the BCCH in step S1, are available for TCH assignment in this step S2. Thus, if the BTS has access to more than two transceivers at least two of them could be assigned to the TCH TRX group. In addition, the BCCH TRX dedicated in step S1 can actually be employed for transmission of traffic data using time slot(s) not assigned for the BCCH channel.

The increase in the radio coverage area of the BTS according to the present invention is achieved by providing transmit diversity to both the traffic channel(s) and the broadcast control channels.

As is used in the prior art GSM systems and such systems adopting the EDGE technology, frequency hopping is performed in step S3 for the traffic channel to provide transmit diversity and thereby increase the radio coverage area associated with the traffic channel. In this frequency hopping of step S3, the BTS hops according to a selected or predefined frequency hopping scheme among at least two carrier frequencies assigned to the BTS. As the transmitted radio signals of the traffic channels are subject to frequency-selective multipath fading at the receivers, the frequency hopping conducted in step S3 combats the fading by using more than one carrier frequency for the traffic channel.

Figure 2A:
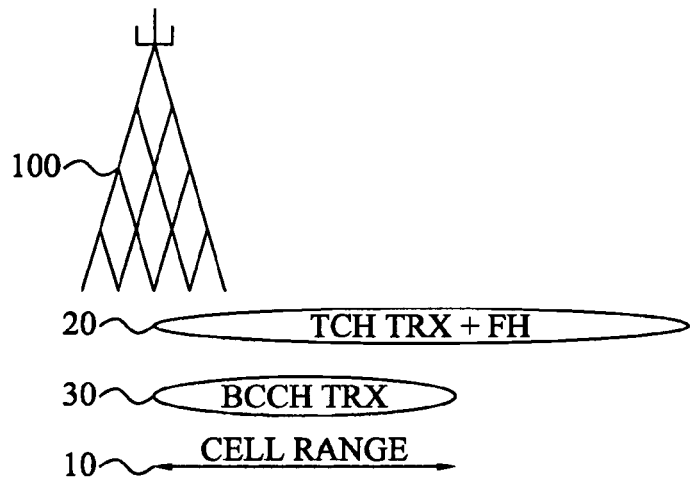
FIG. 2A is an illustration of the radio coverage area of a base transceiver station according to the prior art.

FIG. 2A is a diagram illustrating the radio coverage area 10 of a BTS 100 using frequency hopping (FH) for the traffic channel transceivers. The radio coverage area of the BTS will be defined as the intersection of the radio coverage area of the broadcast control channel and the corresponding radio coverage area of the traffic channel. In a preferred implementation, these two areas should, as far as possible, match each other. However, as is seen in FIG. 2A the transmit diversity provided by the frequency hopping will increase the area 20 covered by the TCH transceivers, while the cell range 10 will, as FH is not allowed to be used in connection with the broadcast control channel, be limited by the smaller radio coverage area 30 of the BCCH transceiver. In this prior art situation, the radio coverage increase brought by the frequency hopping will not be fully utilized as the cell area 10 will still be limited with the range of the broadcast control channel.

Note that if the BCCH TRX was selected in step S2 for use with the TCH channel, frequency hopping is not available as the BCCH TRX will not be able to employ frequency hopping.

Returning to FIG. 1, the present invention provides a fully exploit of the TCH area increase by introducing transmit diversity also for the broadcast control channel. In a next step S4, antenna hopping is performed among at least two antenna elements of the BTS connected to the transceiver dedicated to the BCCH in step S1. This antenna hopping is performed according to a selected or predefined antenna hopping scheme to provide antenna diversity and thereby increase the radio coverage area of the BCCH channel. This antenna hopping means that the BCCH signal is transmitted along propagation paths from different antenna elements and to a given receiver element. One example of a multiple antenna arrangement that can be used for the BCCH antenna hopping of the present invention is dual polarized (patch) antennas with common phase centers in a common enclosure.

Figure 2B:
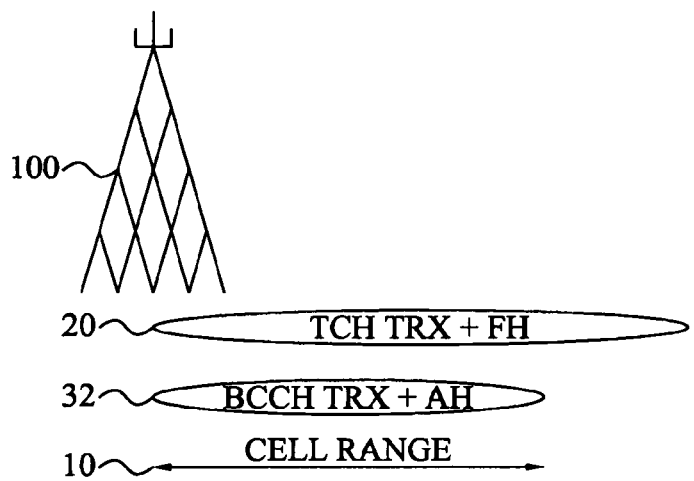
FIGS. 2B and 2C are illustrations of the radio coverage area of a base transceiver station according to embodiments of the present invention.

FIG. 2B illustrates the result of the transmit diversity utilization on both BCCH and TCH. The radio coverage area 20 of the TCH transceiver(s) is still improved due to the frequency hopping. The corresponding radio coverage area 32 of the BCCH transceiver(s) is increased by the antenna hopping and now comes close to the cell range 20 of the TCH channel. The resulting cell range 10 of the BTS 100, defined as the intersection of the two radio coverage areas 20, 32, is significantly improved as compared to the prior art situation of FIG. 2A.

The BCCH transceiver dedication of the present invention is a prerequisite in order to fully exploit the coverage improvement brought by the antenna hopping for the broadcast control channel. The reason for this is that it is important that the multiple transmit branches used for the BCCH should ensure substantially equal antenna direction and substantially equal antenna pattern (lobe or beam) characteristics.

As is known in the art, a multi-transceiver BTS may have access to several antenna arrangements connected to different of the multiple transceivers. The BTS dynamically allocates a given time slot and available transceiver to use for a traffic channel. The BCCH channels, i.e. the logical channels on which control information is transmitted, are typically dedicated one or two timeslots on the transceiver BCCH TRX according to the invention. The invention has the consequence that predefined antenna elements of a given antenna arrangement will be used for all BCCH data. This antenna arrangement may of course also be used for any traffic data through the dedicated BCCH TRX dedication. This in turn makes it possible to achieve equal beam direction and characteristics, which would hardly be possible if the antenna hopping is allowed to be performed between antenna elements of different antenna arrangements.

In the case the BTS has multiple dedicated BCCH transceivers, these transceivers should be connected to the same multi-element antenna arrangement. In such a case, the BTS can switch between these two BCCH transceivers when transmitting control data of the BCCH channel and still achieve the same beam direction and characteristics and thereby fully exploit the coverage improvement brought by the antenna hopping.

The different steps of FIG. 1 can be performed several times during operation of the BTS, which is schematically illustrated by the line L1.

Thus, in the present invention BCCH, TCH and PDTCH are logical channels used for conveying control or traffic data to requesting users. The logical TCH and PDTACH channels can be dynamically allocated a time slot on an available transceiver. This available transceiver typically includes both the (TCH) transceivers that do not carry any BCCH control data and the dedicated BCCH TRX, by using free time slots not occupied by the BCCH channel. As was mentioned in the foregoing, the BCCH channel is typically allocated the first and possible the also the second (TS0 and TS1) time slot of the BCCH TRX in a cell.

A BCCH channel group is a group of frequencies assigned to dedicated BCCH transceivers of the present invention in the different cells of the communication network. In a typical network, there may be 12 to 15 (sometimes even more) frequencies spread through the geographical area of the network. In the cell planning, neighboring cells are assigned different such frequencies in order to reduce the interference on these frequencies between respective co-channel cells. The TCH channel group is another group of frequencies assigned TCH transceivers in different cells. A TRX belonging to a given TCH channel group could imply that the TRX is fixed allocated for a selected frequency in the group (for non-FH or so-called baseband hopping) or alternatively that multiple or all frequencies in the TCH channel group in the case of FH.

FIG. 3 is a flow diagram illustrating additional steps of the method of the present invention illustrated in FIG. 1. The method starts in step S10, where a first TRX group comprising at least two of the BTS transceivers is defined. This first TRX group comprises the transceiver to be dedicated for use with the BCCH channel and at least one other transceiver. If multiple BCCH transceivers is to be dedicated these will be included in the first TRX group. A next step S11, defines a second TRX group comprising at least one BTS transceiver, typically comprising the remaining transceivers of the base transceiver station.

In this illustrative embodiment, the BTS has access to at least two antenna arrangements, of which a first antenna arrangement comprises at least two antenna elements. The transceivers of the first TRX group are connected in step S12 with this first antenna arrangement. This means that data to be transmitted by a transceiver of the first TRX group will be transmitted using an antenna element of the first antenna arrangement. Correspondingly, the transceivers of the second TRX group are connected to a second antenna arrangement of the BTS.

The method then continues to step S1 of FIG. 1, where at least one of the transceivers of the first TRX group is dedicated for transmission of BCCH data. At least one remaining transceiver of the first TRX group is assigned together with at least one transceiver of the second TRX group for transmission of TCH data, i.e. no BCCH control data.

Antenna hopping will then be employed for control data of the BCCH channel as well as traffic data (TCH or PDTCH) from the dedicated BCCH TRX of the first TRX group using the multiple antenna elements of the first antenna arrangement. Data of the TCH channel group is transmitted using frequency hopping and at least one assigned TCH TRX of the first or second TRX group. In this case, it is therefore possible to transmit TCH data using a first TRX group transceiver and the first antenna arrangement or a second TRX group transceiver and the second antenna arrangement.

The TCH transceivers of the first and second TRX group preferably have access to the same carrier frequencies to use in the frequency hopping. Due to the dynamic TRX allocation, antenna hopping may actually be employed also for the TCH channel as TCH transceivers of different TRX groups connected to different antenna arrangements can be used for different radio bursts in the downlink transmission.

The teaching of the present invention as illustrated by FIG. 3 can of course be extended to a situation where the transceivers of the BTS are divided into more than two TRX groups and/or where more than two antenna arrangements are available for the transceivers.

The definition of TRX groups and connection of all transceivers of a given TRX group to the same antenna arrangement has an important impact to the coverage increase achieved by the BCCH antenna hopping. Firstly, in the case of multiple dedicated BCCH transceivers, the same antenna arrangement will be employed for antenna hopping irrespective of which particular BCCH TRX that is currently selected. Secondly, this allows the usage of fallback BCCH transceivers if the dedicated BCCH TRX(s) would become inoperative. This is further explained in connection with FIG. 4. The method continues from step S4 of FIG. 1. In a next step S20, it is determined whether the dedicated BCCH TRX operates correctly. If the TRX is functionally operating, the method continues to step S2 of FIG. 1. This TRX condition check could be performed continuously or periodically in the BTS. However, in most practical implementations it might be most convenient to perform the check in connection with the transmission of BCCH data on the BCCH TRX.

If it is determined that the BCCH TRX is malfunctioning, one of the fallback transceivers becomes a new dedicated BCCH transceiver in step S21. This fallback transceiver is selected from one of the transceivers belonging to the same first TRX group as the malfunctioning BCCH TRX. By selecting the new dedicated BCCH TRX from this first group, it is guaranteed that the same antenna arrangement will be used for antenna hopping and BCCH transmission for the new dedicated BCCH TRX as for the previous BCCH TRX. This in turn allows achieving substantially same beam direction and characteristics. However, if instead the new BCCH would be randomly selected among all the transceivers of the base transceiver station, a TRX connected to another antenna arrangement of the BTS could then be selected. In that case, the beam direction and characteristics will no longer remain substantially the same. The method then continues to step S2 of FIG. 1.

The newly selected BCCH TRX will no longer employ frequency hopping but instead utilizes antenna hopping according to the invention to provide transmitter diversity.

As was described in the foregoing, the at least two, preferably two, antenna elements of the BTS involved in the antenna hopping of the present invention are preferably mutually arranged on the BTS for providing substantially equal beam direction and characteristics. In a first embodiment of the invention, the at least two antenna elements are different antenna elements of a cross-polarized antenna. In such a case, the cross-polarized antenna comprises a first radiating element (antenna element) to provide a first axis of polarization and a second radiating element to provide a second axis of polarization. The first axis of polarization is preferably orthogonal or orthogonal at least in part to the second polarization axis. In another embodiment, the at least two antenna elements are at least two aligned antennas, preferably at least two aligned modular high-gain antennas (MHGA) of the BTS. A MHGA consists of a vertically arranged array of, typically, two or three standard antenna panels connected by a special feed network that enables the array to function as one antenna. The MHGA allows significantly higher gains compared to a traditional antenna. In the case the antenna arrangement comprises more than two antenna elements, these can be configured in the form of an array of antenna elements as in MHGA.

In order to boost the radio coverage even further besides the introduction of frequency hopping for traffic channels and antenna hopping for broadcast control channels, the present invention can perform transmitter coherent combining (TCC). The transmitter coherent combining is preferably performed on the control data carried by the broadcast control channel but could also be applied to data transmitted by the traffic channel. FIG. 5 is a flow diagram illustrating this scenario. The method continues from step S4 of FIG. 1. In a next step S30, transmitter coherent combining is performed on the BCCH transceiver to, ideally, provide a doubling of the base station transceiver output power for the BCCH.

Transmitter coherent combining basically involves providing a digital signal to a first and second transceiver unit. A respective modulation scheme, preferably a constant-envelope modulation scheme, is selected and applied in the first and second transceiver units. Optionally, but preferably the first (or second) modulated signal is phase shifted to compensate for differences in phase characteristics between the paths through amplifier stages of the first and second transceiver units. The first, phase-shifted, modulated signal is converted to a first analogue signal and the second modulated signal is likewise converted into a second analogue signal. The two analogue signals are separately amplified in a respective power amplifier of the first and second transceiver units. The two amplified signals are then combined to double the amplitude of a single-carrier output signal of the BCCH channel to be transmitted. The method then continues to step S2 of FIG. 1.

TCC may provide a coverage improvement to the BCCH TRX and thereby to the BTS, as the BCCH coverage is the limiting factor, with up to 2.5-3 dB. This coverage gain is additive to the gains from antenna hopping.

Figure 2C:
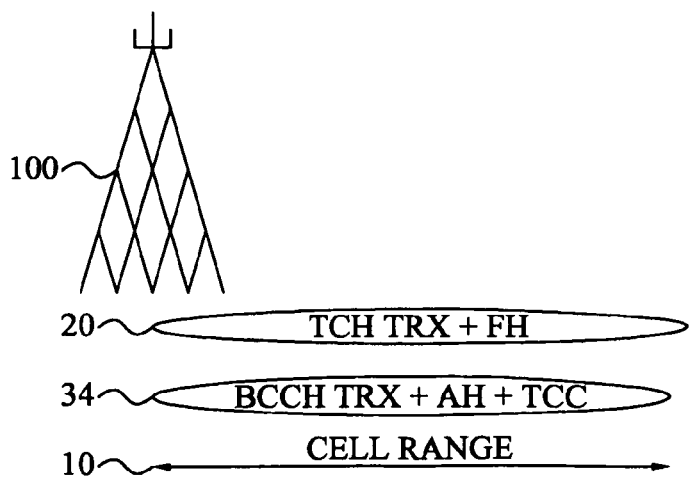

FIG. 2C illustrates the resulting radio coverage ranges achievable according to this embodiment of the present invention. By employing both antenna hopping and transmitter coherent combining on the BCCH, the associated cell range 34 for that control channel approaches the cell range achievable for the TCH when using frequency hopping. As a consequence, the resulting cell range 10 of the base transceiver station 100 will be significantly improved as compared to the prior art situation illustrated in FIG. 2A and also improved as compared to the embodiment disclosed in FIG. 2B, i.e. without any transmitter coherent combining.

The balancing of radio coverage between the TCH channel and the BCCH channel obtainable by introducing antenna hopping on the BCCH TRX according to the present invention is mainly achievable in noise-limited communication networks. In a noise-limited network, the network performance is primarily limited by noise. This also means that the network is "coverage limited". In other words, there is so limited interference from other users of the system radio resources, that to work properly the received signal strength needs only to combat the background noise level to reach required quality level. In such a network, an increased output power from the base transceiver station would increase the possibilities to receive a downlink signal correctly at a given distance.

In an interference-limited network scenario, i.e. in high capacity utilized networks, it is expected that sufficient BCCH performance is achieved by sparse frequency planning and without needs for increased transmitter diversity. In such an interference-limited network, the network performance is primarily limited by the amount of interference. The network is dense enough (short BTS distances and high traffic load) such that the background noise level is practically negligible. In such a network, it may not be very useful to increase the transmitted power since this would increase the total power in the network, possibly triggering an increased power level also from interfering base transceiver stations.

Simulations have been conducted to illustrate the radio coverage increasing potential of antenna hopping. Antenna hopping has the potential to give up to 6 dB improvement (at 1% frame error rate (FER)) depending on radio environment, for enhanced full rate (EFR) speech in a noise-limited network. This FER value can be regarded as a typical quality requirement threshold for speech data. Packet switch (PS) data transmission with strong modulation and coding schemes (MCS), such as MCS-1 (Gaussian minimum shift keying, GMSK) and MCS-5 (8 phase-shift keying, 8-PSK) will gain around 2-3 dB at 10% block error rate (BLER). This 10% BLER level is typically an upper threshold of what is acceptable for control channels, such as BCCH. With less robust coding than MCS-1, the increased diversity is not exploited to the same extent, resulting in less improvement of BCCH radio coverage. However, this is not unique for antenna hopping but applies to all transmission diversity schemes, including frequency hopping. Furthermore, the potential gains from antenna hopping are more prominent for slowly moving or static user terminals. For user terminals travelling at high speeds, the expected relative antenna hopping improvement will be reduced. This is a well-known fact and true for all transmission diversity schemes, including frequency hopping.

Simulations have been performed for a possible BTS configuration to estimate the increase in radio coverage for the BCCH TRX. In this simulation, the BTS was a 60 m tower, using the carrier frequency of 900 Mz, in an outdoor rural setting. The actual parameters employed are listed in Table I below:

TABLE I

BTS simulation parameters

| | No AH | AH |
|---|---|---|
| BTS downlink | | |
| BTS power (dBm) | 45.5 | 45.5 |
| AH | 0 | 2 |
| Feeder loss (dB) | 2.4 | 2.4 |
| Jumper loss (dB) | 0.5 | 0.5 |
| TMA* loss (dB) | 0.3 | 0.3 |
| TX antenna gain (dBi) | 17 | 17 |
| MS receiver sensitivity (dBm) | −104 | −104 |
| EIRP** | 59.3 | 59.3 |
| Max DL pathloss (dB) | 163.3 | 165.3 |
| BTS uplink | | |
| MS output power (dBm) | 33 | 33 |
| Ms power offset | 0 | 0 |
| RX diversity gain (dB) | 3.5 | 3.5 |
| Feeder + Jumper loss (dB) | 0 | 0 |
| RX antenna gain (dBi) | 17 | 17 |
| BTS receiver sensitivity (dBm) | −111.5 | −111.5 |
| Max UL pathloss (dB) | 165 | 165 |

*Tower mounted amplifier
**Equivalent isotropically radiated power

The results of the simulation was that the cell range increased from 26.6 km to 29.9 km and the radio coverage area increased from 1378 km$^2$ into 1744 km$^2$. Thereby, antenna hopping provided an improved coverage of 26.5%.

The coverage gains of TCC are additive to the gains from antenna hopping. If TCC is used together with antenna hopping in the simulations above, the improvement in radio coverage increases to 31.9%.

Figure 6:
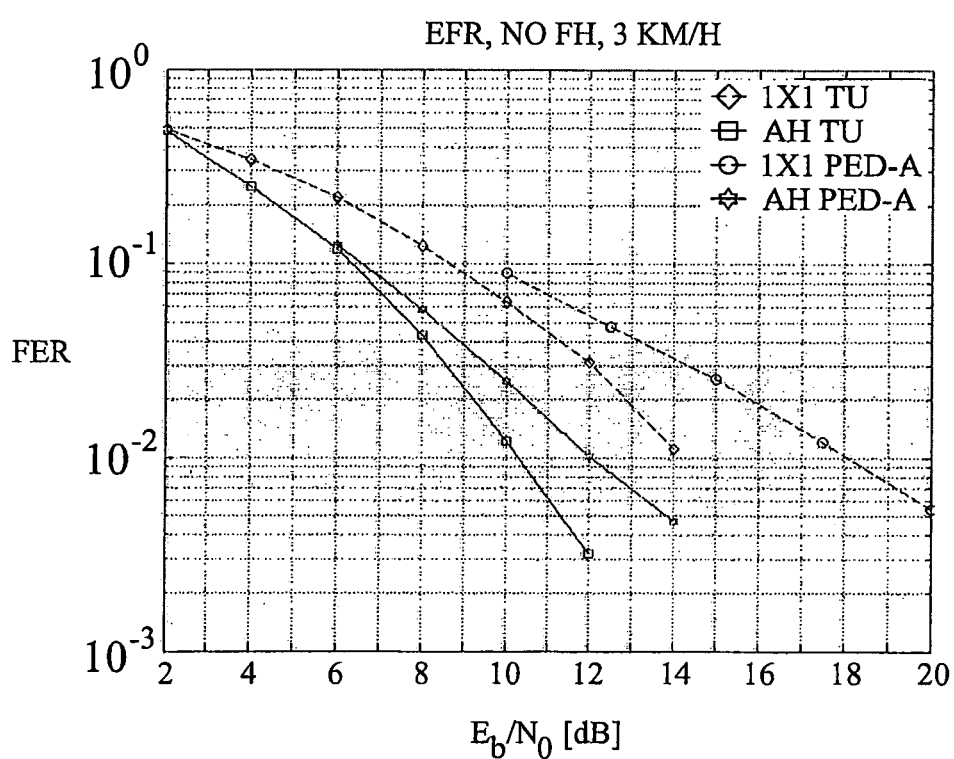
FIG. 6 is a diagram illustrating the transmit diversity gains of antenna hopping for Enhanced Full Rate (EFR) speech data in a noise-limited environment.

FIG. 6 is a diagram illustrating the gain of applying antenna hopping to EFR speech in two different radio environments: pedestrian A (PedA) and typical urban (TU) at a travelling speed of 3 km/h. At 1% FER, antenna hopping results in an improvement of more than 3.5 dB for TU and about 6 dB for PedA. PedA and TU are two different channel models that are well-known in the art and used in standardization. TU models a typical urban environment, while PedA is a channel model with comparatively lower degree of time dispersion. For more information of the channel model TU, reference is made to standardization document [1], in particular section C.3.3, page 102. Correspondingly, more information of the PedA channel model can be found in the standardization document [2], in particular section B.2.2, pages 123-124.

The coverage gain of antenna hopping for BCCH depends on the utilized channel coding as noted above. Thus, for more robust channel coding, the improvement is larger as compared to less robust coding. In GSM, half rate convolutional channel coding is employed for the relevant signalling channels on BCCH and for EFR. Also the interleaving employed for transmitted data affects the antenna hopping, in terms of having an impact on the particular antenna hopping sequence to employ. Generally, the antenna hopping sequence should be selected so that at least one antenna hop is conducted within a radio block. Furthermore, the interleaving depth should not be shorter than the antenna hopping sequence. For GSM, 4-interleaving is today employed for the relevant signalling channels on BCCH. In such a case, the antenna hopping scheme should preferably change antenna elements at least once for four consecutive radio bursts.

The present invention is not limited to a particular antenna hopping scheme as long as the above listed preferred conditions are fulfilled. The invention could, for example, use a simple cyclic scheme that switches between antenna elements for each burst:

ABABABABABABABAB . . .

where A represents a radio burst transmitted by the first antenna element and B represents a radio burst transmitted by the second antenna element of the antenna arrangement. Another possibility is to send two consecutive bursts on the first antenna element (first polarization) and thereafter two burst on the second element (second polarization):

AABBAABBAABBAABB . . .

The invention also encompasses usage of more elaborated cyclic and non-cyclic antenna hopping schemes well-known in the art. In addition, more than two antenna elements could be included in the antenna arrangement connected to the BCCH TRX. In such a case, all these elements or at least subset thereof could be employed in the antenna hopping scheme.

The present invention can likewise be used with different cyclic or non-cyclic frequency hopping schemes utilizing two or more carrier frequencies, which are standardised or elsewhere known in the art.

Figure 7:
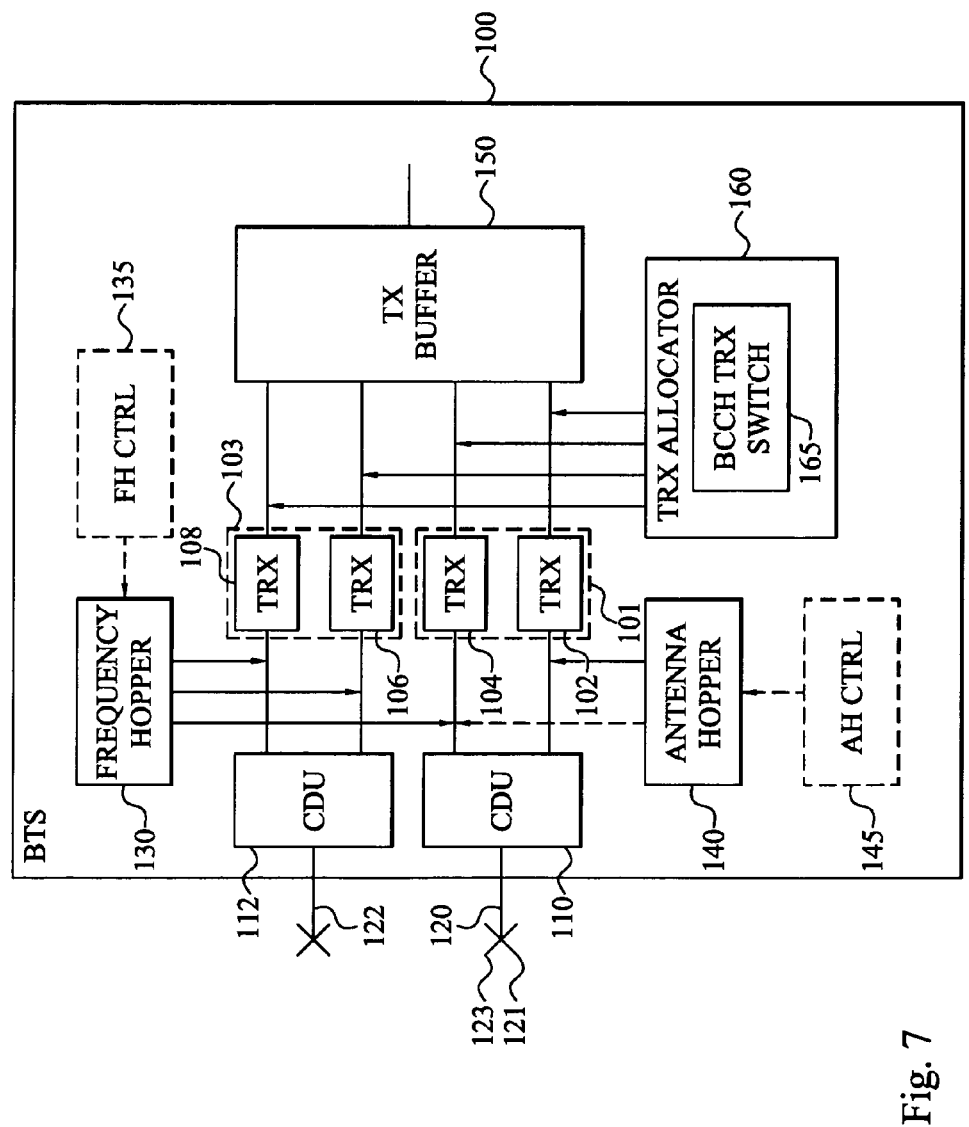
FIG. 7 is a schematic block diagram of an embodiment of a base transceiver station according to the present invention.

FIG. 7 is a schematic block diagram of an embodiment of a base transceiver station 100 according to the present invention. The base transceiver station 100 has access to multiple, in the figure non-limitedly represented by four, transceivers 102, 104, 106, 108 used for transmission of traffic channel data and broadcast channel data to user terminals present within the radio coverage area of the BTS 100. In the figure one of the transceivers 102 is dedicated for the BCCH of the BTS 100 and forwards control data (and traffic data) from a connected transmit buffer 150 to a connected antenna arrangement 120, possibly through a combining and distribution unit (CDU) 110. The antenna arrangement 120 connected to the BCCH TRX 102 has access to multiple, in the figure represented by two, antenna elements 121, 123 enabling antenna hopping for the BCCH data. In the figure, this antenna arrangement 120 has been exemplified by a cross-polarized antenna 120 that is preferred as it ensures equal beam direction and characteristics of the antenna beams from the two antenna elements 121, 123. This equal coverage area of the two antenna elements (polarizations) is obtainable even for external effects, such as wind, precipitation, etc.

The BCCH TRX 101 is controlled by an antenna hopper 140 that performs the antenna hopping according to a selected antenna hopping scheme among the two antenna elements 121, 123 of the cross-polarized antenna 120. This antenna hopper 140 may in turn be controlled by an antenna hopper controller 145 that selects the particular antenna hopping scheme to employ for the antenna hopper 140. If the antenna hopper 140 is to use only one predefined scheme throughout the whole operation, the controller 145 may not be needed and can be omitted. However, as the optimal antenna hopping scheme to utilize for the BCCH channel may depend on various factors, such as channel coding, interleaving, re-transmission possibilities, experienced radio environment, the antenna hopper controller 145 can have access to multiple predefined antenna hopping schemes and (dynamically) select an appropriate antenna hopping scheme based on different inputs. These inputs could be current radio quality parameters measured by the BTS 100 or received from user terminals and coding and interleaving information from the BCCH transceiver 102. Instead of utilizing multiple predefined antenna hopping schemes to select among, the controller 145 could (dynamically) modify and adjust an antenna hopping scheme currently employed by the hopper 140 to adapt for changes in signal processing and/or radio quality.

The remaining transceivers 104, 106, 108 of the BTS 100 are available for use in connection with other logical channels of the BTS 100, including a traffic channel. A frequency hopper 130 is connected to and controls these transceivers 104, 106, 108 for the purpose of employing frequency hopping between different available carrier frequencies for the TCH data, including PDTCH data, forwarded by the transceivers 104, 106, 108 to their connected antenna arrangements 120, 122. The frequency hopper 130 utilizes a predefined or selected frequency hopping scheme when determining, preferably on a radio burst basis, which carrier frequency to employ for TCH data. An optional frequency hopper controller 135 could be connected to the frequency hopper 130 for controlling which particular hopping scheme to employ. In similarity to the antenna hopper controller 145, this controller 135 can have access to multiple predefined hopper schemes and dynamically select a scheme to currently be used by the frequency hopper 130 based on different inputs.

In a preferred embodiment of the present invention, the transceivers 102, 104, 106, 108 of the BTS 100 are divided or classified into different transceiver groups 101, 103. Preferably each such transceiver group 101, 103 is connected to a dedicated antenna arrangement 120, 122. Thus, if the BTS 100 has access to N antenna arrangements 120, 122, the available transceivers 102, 104, 106, 108 are preferably divided into N TRX groups 101, 103.

The first TRX group 101 comprises the dedicated BCCH TRX 102 and at least one, in the figure one, TCH TRX 104. The transceivers 102, 104 of this first TRX group 120 are connected to a first cross-polarized antenna 120 through an optional CDU 110. This CDU 110 functions as a filter for the signals from the transceivers 102, 104 but also for signals received by the antenna arrangement 120. Generally, the CDU 110 can be regarded as an interface between the transceivers 102, 104 and the antenna arrangement 120. All signals typically filtered before transmission and after reception by means of bandpass filters in the CDU 110. The CDU 110 allows several transceivers 102, 104 to share a common antenna arrangement 120. The unit 110 combines transmitted signals from the transceivers 102, 104 and also distributes the received signals to the transceivers 102, 104.

In the figure the remaining two transceivers 106, 108, assigned for the TCH channel or some other control channel, form a second TRX group 103. The transceivers 106, 108 of this group are connected to a second cross-polarized antenna 122, preferably through a second CDU 112.

In the illustrative figure, three transceivers 104, 106, 108 are available for usage in connection with the data other than BCCH data of the BTS 100. All of these transceivers 104, 106, 108 can therefore utilize frequency hopping as controlled by the frequency hopper 130. The TCH TRX 104 of the first TRX group 104 can preferably also use antenna hopping as, depending on the actual connection in the BTS 100, antenna hopping is applied by the antenna hopper 140 to all transceivers 102, 104 of the first TRX group 101.

A preferred TRX allocator 160 is implemented in the BTS 100 for selecting a TRX to use when transmitting traffic data present in a transmitter buffer 150. This allocator 160 therefore performs a dynamic assignment of TRX to use for the traffic channel. This allocator 160 can select one of the transceivers 104, 106, 108 that can use frequency hopping or the BCCH TRX 102 that cannot use frequency hopping but instead uses antenna hopping according to the invention for all its time slots.

Furthermore, generally a single TRX 102 is dedicated as BCCH TRX. This means that no allocation of BCCH transceiver to use is generally necessary. However, if a given TRX group comprises multiple dedicated BCCH transceivers, the TRX allocator 160 could also dynamically allocate BCCH transceiver. In this case it is a prerequisite according to the present invention that the multiple dedicated BCCH transceivers are connected to the same antenna arrangement in order to provide equal beam direction and characteristics.

The BTS 100 also preferably comprises a BCCH TRX switch 165, such as implemented in the TRX allocator 160. This switch 165 becomes operated if the dedicated BCCH TRX becomes inoperative or malfunctions for some reason. The switch 165 then selects a new transceiver 104 to become the dedicated BCCH TRX. This selection is performed among those transceivers 104 that belong to the same TRX group 101 as the previously dedicated, malfunctioning BCCH TRX 102. In other words, the new BCCH TRX 104 is then guaranteed to be connected to the same cross-polarized antenna 120 as the previous BCCH TRX 102. This in turn secures that the beam direction and characteristics will remain the same even after the BCCH TRX switch, which is important for keeping the radio coverage improvement brought by the BCCH antenna hopping.

As the TRX 104 becomes a dedicated BCCH TRX it does no longer apply frequency hopping. Therefore any traffic data transmitted using that TRX 104 can only benefit from antenna hopping.

Figure 8:
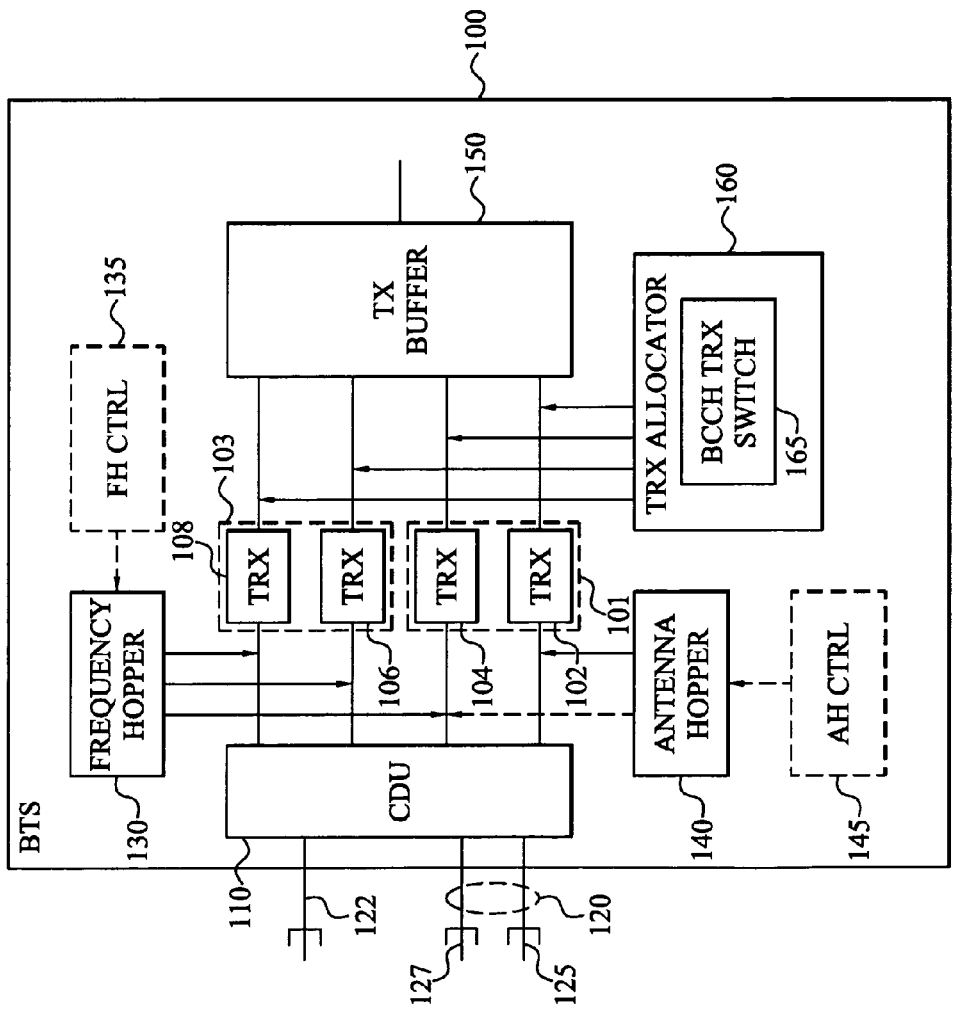
FIG. 8 is a schematic block diagram of another embodiment of a base transceiver station according to the present invention.

FIG. 8 illustrates another embodiment of BTS 100 according to the present invention. In this BTS embodiment, the cross-polarized antenna of the first TRX group 101 has been exchanged by an antenna arrangement 120 comprising multiple, in the figure two, aligned antennas 125, 127. These two antennas 125, 127 could actually be any suitable antenna type available in the art and that can be aligned to form an antenna arrangement. For example, the two antennas 125, 127 could be two modular high gain antennas. As the two antenna 125, 127 are aligned they will ideally provide the same or substantially same beam directions and characteristics for the BCCH hopping between the two antennas 125, 127.

The antenna arrangement 122 connected to the second TRX group 103 could be a single antenna, such as of the same type as one of the antennas 125, 127 of the first antenna arrangement 120.

This figure also illustrates another possible CDU 110 implementation. In this case a single CDU 110 is employed for all transceivers 102, 104, 106, 108. The CDU 110 will then make sure that the output from one of the transceivers 102, 104, 106, 108 is forwarded to the correct antenna arrangement 120, 122. In other words, signals from transceivers 102, 104 of the first TRX group 101 are sent to the first antenna arrangement 120, while signals from the second TRX group 103 are forwarded to the second antenna arrangement 122.

The units 102, 104, 106, 108, 110, 112, 130, 135, 140, 145, 160 and 165 of the BTS 100 may be implemented or provided as software, hardware or a combination thereof.

Figure 9:
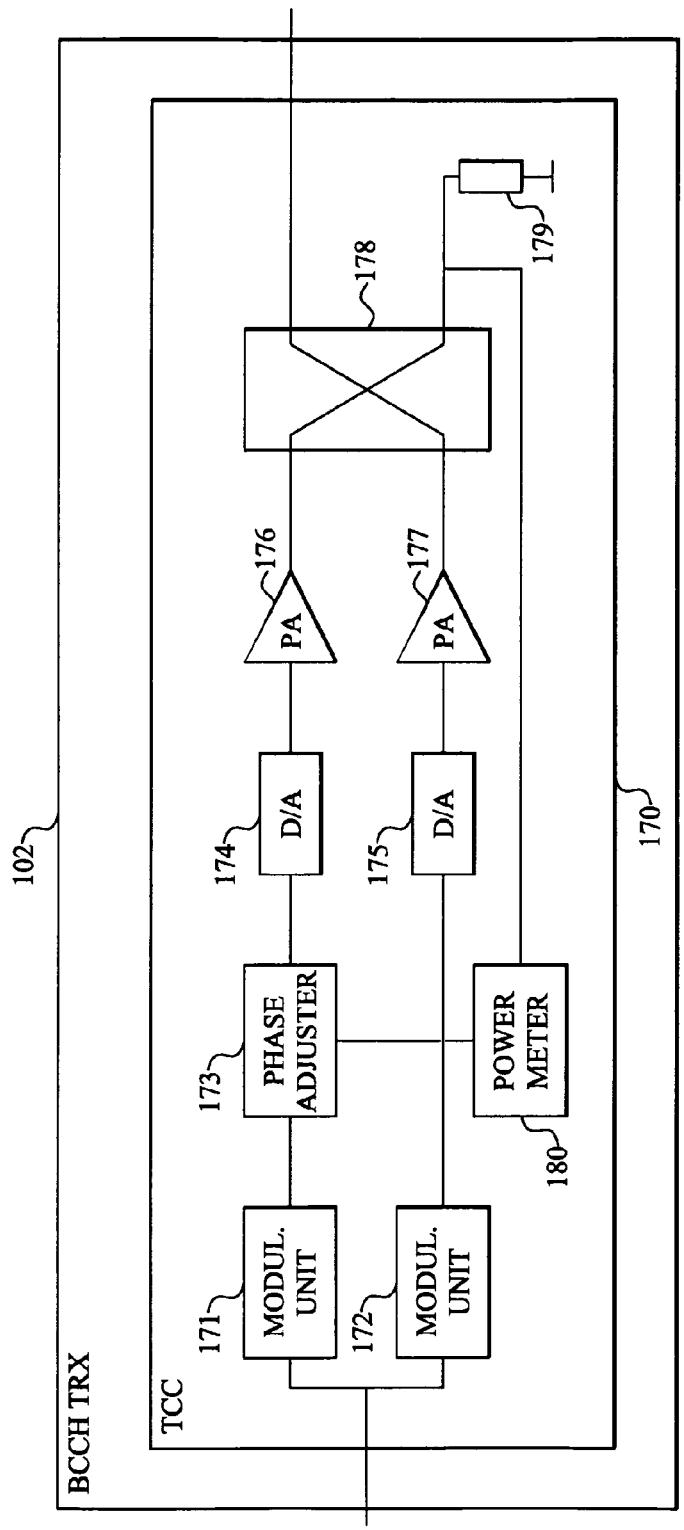
FIG. 9 is a schematic block diagram of a broadcast control channel (BCCH) transceiver equipped with a transmit coherent combining unit.

As was mentioned in the foregoing, the radio coverage improvement provided by the antenna hopping for BCCH according to the present invention can be increased by also employing transmitter coherent combining for the BCCH and optionally also for the TCH of the BTS. FIG. 9 is a simplified block diagram of a BCCH TRX 102 equipped with a transmitter coherent combining unit 170. The TCC 170 comprises two signal paths that process the same input signal (BCCH signal). The first signal path comprises a first modulation unit 171 receiving the digital input signal. The unit 171 modulates the digital signal according to a selected modulation scheme. The modulated output signal is brought to a digital-to-analogue (D/A) converter 174, through a phase adjuster 173. The converter 174 converts the digital input to analogue voltages that are further modulated in a mixer (not illustrated) with the carrier frequency. The output from the D/A converter 174 is provided to a power amplifier 176 for amplification. The second signal path comprises a second modulation unit 172, a second D/A converter 175 and a second power amplifier 177. The operation of these units is similar as to the first path units.

The outputs from the two power amplifiers 176, 177 are provided to a hybrid combiner 178. This combiner 178 combines the two signals into a transmitter signal that is provided the antenna arrangement of the BCCH TRX 102 optionally first through a CDU. The input power supplied by the power amplifiers 176, 177 is at least to a part provided as a transmitter signal power. However, any remaining power till be dissipated by a hybrid load 179.

The power dissipated over the hybrid load 179 can be measured a power meter 180. The output of the power meter 180 is connected to the phase adjuster 173. The phase adjuster 173, thus, utilizes the value of the hybrid load power for calculating any phase shift between the amplified signals provided to the hybrid 178.

The units 171, 172, 173, 174, 175, 176, 177, 178, 179 and 180 of the TCC 170 may be implemented or provided as software, hardware or a combination thereof.

The present invention provides an increased BCCH radio coverage to a base transceiver station and thereby, as this BCCH coverage is limiting the overall radio coverage of the base transceiver station, an increased cell coverage/range. FIG. 10A schematically illustrates this increased radio coverage for a sectorized cell 10. In the left portion of figure, two base transceiver stations 200 operating according to the prior art techniques are illustrated with their respective cells 30. In the right portion of the figure, the two illustrated base transceiver stations 100 are according to the present invention and thereby has increased size of their relative cells 10. The increased coverage obtainable according to the present invention can be advantageously utilized during the planning of a cellular radio-based communication network 1. The site-to-site distance, i.e. the distance between base transceiver stations 100, can be increased by using base transceiver stations 100 of the invention instead of prior art base transceiver stations 200. This in turn implies that fewer base transceiver stations may be required for covering the whole area of the communication network 1.

The present invention can also be employed for covering existing coverage holes or providing better margin at cell borders, such as improved sea coverage at the coast line. FIG. 10B schematically illustrates this technique. In this case, two of the illustrated base transceiver stations 200 has the poorer cell coverage 30 according to the prior art techniques. Another network node 100 of the network 1 uses a base transceiver station according to the present invention for improving the cell coverage in one of the cells (sectors) of that site. The remaining cells 30 have the poorer prior art coverage.

The present invention can therefore be used in the network planning by arranging at least one base transceiver station according to the present invention within the communication network. The site planning of the base transceiver stations within the network is then performed at least partly based on the increased radio coverage area attainable by the at least one base transceiver station of the present invention. In this network, all base transceiver stations could be according to the present invention or a mixture of poor-range prior art BTS and base transceiver stations of the invention can be used.

It will be understood by a person skilled in the art that various modifications and changes may be made to the present invention without departure from the scope thereof, which is defined by the appended claims.

REFERENCES

[1] 3GGP TS 45.005 version 7.8.0; 3$^{rd}$ Generation Partnership Project; Technical Specification Group GSM/EDGE Radio Access Network; Radio transmission and reception; Release 7

[2] 3GGP TS 25.101 version 7.6.0; 3$^{rd}$ Generation Partnership Project; Technical Specification Group Radio Access Network; User Equipment (UE) radio transmission and reception (FDD); Release 7

The invention claimed is:

1. A method of increasing a radio coverage area of a base transceiver station having multiple transceivers, said method comprising the steps of:
    defining a first transceiver group comprising at least one first transceiver and at least one third transceiver of said multiple transceivers, said at least one first transceiver and said at least one third transceiver are connected to a first antenna arrangement;
    defining a second transceiver group comprising at least one second transceiver of said multiple transceivers, said at least one second transceiver is connected to a second antenna arrangement;
    dedicating said at least one first transceiver of said first transceiver group for a broadcast control channel carrying control data;
    assigning said at least one second transceiver of said second transceiver group and said at least one third transceiver of said first transceiver group for a downlink traffic channel;
    dedicating said at least one third transceiver for said broadcast control channel if said at least one first transceiver becomes inoperative;
    performing frequency hopping according to a selected frequency hopping scheme among at least two carrier frequencies assigned to said base transceiver station for said downlink traffic channel to provide a first form of transmitter diversity and increase a radio coverage area associated with said downlink traffic channel; and
    performing antenna hopping according to a selected antenna hopping scheme among at least two antenna elements of the first antenna arrangement for said broadcast control channel to provide a second different form of transmitter diversity and increase a radio coverage area associated with said broadcast control channel, said radio coverage area of said base transceiver station being defined as the intersection of said radio coverage area associated with said downlink traffic channel and said radio coverage area associated with said broadcast control channel.

2. The method according to claim 1, further comprising:
    dynamically assigning a transceiver of said at least one second transceiver and said at least one third transceiver for transmitting data of said downlink traffic channel.

3. The method according to claim 1, further comprising:
    mutually arranging said at least two antenna elements on said base transceiver station for providing equal direction and beam characteristics.

4. The method according to claim 1, wherein said at least two antenna elements being antenna elements of a cross-polarized antenna.

5. The method according to claim 1, wherein said at least two antenna elements are at least two aligned antennas.

6. The method according to claim 1, further comprising:
    performing transmitter coherent combining of control data carried by said broadcast control channel for increasing said radio coverage area associated with said broadcast control channel.

7. The method according to claim 1, wherein said antenna hopping performing step comprises performing antenna hopping among said at least two antenna elements according to an antenna hopping scheme selected based on an expected coding and interleaving employed for said control data.

8. A base transceiver station comprising:
    a first antenna arrangement comprising at least two antenna elements;
    a first transceiver group comprising at least one first transceiver dedicated for a broadcast control channel carrying control data and at least one third transceiver assigned for a downlink traffic channel, said at least one first transceiver and said at least one third transceiver are connected to said first antenna arrangement;
    a second antenna arrangement;
    a second transceiver group comprising at least one second transceiver assigned for said downlink traffic channel, said at least one second transceiver is connected to said second antenna arrangement;
    a transceiver switch for automatically dedicating said at least one third transceiver for said broadcast control channel if said at least one first transceiver becomes inoperative;
    a frequency hopper, implemented at least partially using hardware, configured to perform frequency hopping according to a selected frequency hopping scheme among at least two carrier frequencies assigned to said base transceiver station for said downlink traffic channel to provide a first form of transmitter diversity and increase a radio coverage area associated with said downlink traffic channel; and
    an antenna hopper, implemented at least partially using hardware, configured to perform antenna hopping according to a selected antenna hopping scheme among said at least two antenna elements for said broadcast control channel to provide a second different form of transmitter diversity and increase a radio coverage area associated with said broadcast control channel, said radio coverage area of said base transceiver station being defined as the intersection of said radio coverage area associated with said downlink traffic channel and said radio coverage area associated with said broadcast control channel.

9. The base transceiver station according to claim 8, further comprising a transceiver assigner implemented at least partially using hardware, configured to dynamically assign a transceiver of said at least one second transceiver and said at least one third transceiver for transmitting data of said downlink traffic channel.

10. The base transceiver station according to claim 8, wherein said at least two antenna elements are mutually arranged on said base transceiver station for providing equal direction and beam characteristics.

11. The base transceiver station according to claim 8, wherein said at least two antenna elements being antenna elements of a cross-polarized antenna.

12. The base transceiver station according to claim 8, wherein said at least two antenna elements are at least two aligned antennas.

13. The base transceiver station according to claim 8, further comprising a transmitter coherent combining unit, implemented at least partially using hardware, operative together with said antenna hopper to provide transmitter coherent combining of control data carried by said broadcast control channel for increasing said radio coverage area associated with said broadcast control channel.

14. The base transceiver station according to claim 8, wherein said antenna hopper is configured to perform antenna hopping among said at least two antenna elements according to an antenna hopping scheme selected based on an expected coding and interleaving employed for said control data.

15. The base transceiver station according to claim 8, wherein said base transceiver station is installed in a noise-limited radio-based communication network.

16. A method of planning a cellular radio-based communication network, said method comprising the steps of:
arranging, within said communication network, at least one base transceiver station comprising:
  a first antenna arrangement comprising at least two antenna elements,
  a first transceiver group comprising at least one first transceiver dedicated for a broadcast control channel carrying control data and at least one third transceiver assigned for a downlink traffic channel, said at least one first transceiver and said at least one third transceiver are connected to said first antenna arrangement,
  a second antenna arrangement, and
  a second transceiver group comprising at least one second transceiver assigned for said downlink traffic channel, said at least one second transceiver is connected to said second antenna arrangement;
automatically dedicating said at least one third transceiver for said broadcast control channel if said at least one first transceiver becomes inoperative;
performing frequency hopping according to a selected frequency hopping scheme among at least two carrier frequencies assigned to said base transceiver station for said downlink traffic channel to provide a first form of transmitter diversity and increase a radio coverage area associated with said downlink traffic channel; and
performing antenna hopping to a selected antenna hopping scheme among said at least two antenna elements for said broadcast control channel to provide a second form of transmitter diversity and increase a radio coverage area associated with said broadcast control channel, said radio coverage area of said base transceiver station being defined as the intersection of said radio coverage area associated with said downlink traffic channel and said radio coverage area associated with said broadcast control channel; and
performing a site planning of base transceiver stations within said communication network based at least partly said increased radio coverage area of said at least one base transceiver station.

* * * * *

UNITED STATES PATENT AND TRADEMARK OFFICE
CERTIFICATE OF CORRECTION

PATENT NO. : 8,879,477 B2
APPLICATION NO. : 12/294733
DATED : November 4, 2014
INVENTOR(S) : Bruin et al.

It is certified that error appears in the above-identified patent and that said Letters Patent is hereby corrected as shown below:

On the title page item (57), Line 6, delete "5 comprising" and insert -- comprising --, therefor.

On the title page item (57), Line 12, delete "10 coverage (10)" and insert -- coverage (10) --, therefor.

Signed and Sealed this
Fourth Day of October, 2016

Michelle K. Lee
*Director of the United States Patent and Trademark Office*